(12) United States Patent
Hinchliffe et al.

(10) Patent No.: US 7,159,036 B2
(45) Date of Patent: Jan. 2, 2007

(54) UPDATING DATA FROM A SOURCE COMPUTER TO GROUPS OF DESTINATION COMPUTERS

(75) Inventors: Alexander James Hinchliffe, Milton Keynes (GB); Fraser Peter Howard, Chipping Norton (GB); Bobby Rai, Kettering (GB); Andrew Kemp, Oxford (GB)

(73) Assignee: McAfee, Inc., Santa Clara, CA (US)

( * ) Notice: Subject to any disclaimer, the term of this patent is extended or adjusted under 35 U.S.C. 154(b) by 919 days.

(21) Appl. No.: 10/006,242

(22) Filed: Dec. 10, 2001

(65) Prior Publication Data

US 2003/0110280 A1 Jun. 12, 2003

(51) Int. Cl.
G06F 15/173 (2006.01)
(52) U.S. Cl. ................ 709/242; 709/223; 709/225; 709/242
(58) Field of Classification Search ............. 709/700, 709/213, 217–219, 221, 232, 240, 223, 225, 709/242
See application file for complete search history.

(56) References Cited

U.S. PATENT DOCUMENTS

| | | | | |
|---|---|---|---|---|
| 3,710,351 A | * | 1/1973 | Nakamura | 709/225 |
| 4,961,224 A | * | 10/1990 | Yung | 713/201 |
| 5,517,622 A | * | 5/1996 | Ivanoff et al. | 709/232 |
| 6,035,423 A | * | 3/2000 | Hodges et al. | 714/38 |
| 6,065,021 A | * | 5/2000 | George | 715/502 |
| 6,073,126 A | * | 6/2000 | Endo et al. | 706/45 |
| 6,229,799 B1 | * | 5/2001 | Caillerie et al. | 370/347 |
| 6,243,766 B1 | * | 6/2001 | Sliger et al. | 710/2 |
| 6,266,774 B1 | * | 7/2001 | Sampath et al. | 713/201 |
| 6,269,456 B1 | * | 7/2001 | Hodges et al. | 714/38 |
| 6,298,424 B1 | * | 10/2001 | Lewchuk et al. | 711/158 |
| 6,345,288 B1 | * | 2/2002 | Reed et al. | 709/201 |
| 6,466,932 B1 | * | 10/2002 | Dennis et al. | 707/3 |
| 6,557,111 B1 | * | 4/2003 | Theimer et al. | 714/4 |
| 6,574,657 B1 | * | 6/2003 | Dickinson | 709/203 |
| 6,651,249 B1 | * | 11/2003 | Waldin et al. | 717/170 |
| 6,654,746 B1 | * | 11/2003 | Wong et al. | 707/10 |
| 6,654,786 B1 | * | 11/2003 | Fox et al. | 709/203 |
| 6,704,768 B1 | * | 3/2004 | Zombek et al. | 709/201 |
| 6,760,910 B1 | * | 7/2004 | Eilert et al. | 718/104 |
| 6,832,371 B1 | * | 12/2004 | Hussey | 717/165 |
| 6,907,460 B1 | * | 6/2005 | Loguinov et al. | 709/224 |
| 6,952,714 B1 | * | 10/2005 | Peart | 709/203 |
| 7,013,330 B1 | * | 3/2006 | Tarbotton et al. | 709/219 |
| 7,054,902 B1 | * | 5/2006 | Toporek et al. | 709/203 |
| 2002/0016959 A1 | * | 2/2002 | Barton et al. | 717/178 |
| 2002/0049561 A1 | * | 4/2002 | Garcia-Luna-Aceves et al. | 702/182 |
| 2002/0054321 A1 | * | 5/2002 | Kikuchi | 358/1.15 |
| 2002/0078222 A1 | * | 6/2002 | Compas et al. | 709/232 |

(Continued)

*Primary Examiner*—William Vaughn
*Assistant Examiner*—Kamal Divecha
(74) *Attorney, Agent, or Firm*—Zilka-Kotab, PC; Christopher J. Hamaty

(57) ABSTRACT

A source computer 8 stores updated data that is to be distributed to a plurality of destination computers (12 to 30). The destination computers (12 to 30) are divided into groups sharing a common priority level (5, 4, 3, 2, 1). Each of these groups is then associated with a push update task to be executed by the source computer 8. These push update tasks are then sequentially executed. If a particular group of destination computers exceeds a threshold size, then it may be further divided in accordance with a hierarchy of splitting rules. The push update tasks use multicasting to transfer the update data to the destination computers within their groups in a manner that reduces network traffic.

17 Claims, 5 Drawing Sheets

U.S. PATENT DOCUMENTS

2002/0138588 A1* 9/2002 Leeds .......................... 709/217
2002/0174358 A1* 11/2002 Wolff et al. ................. 713/200
2003/0110280 A1* 6/2003 Hinchliffe et al. .......... 709/232
2003/0117434 A1* 6/2003 Hugh ......................... 345/744
2004/0054764 A1* 3/2004 Aderton et al. ............. 709/223

* cited by examiner

SPLITTING RULE HIERARCHY

1) SPLIT BY IP SUBNET

2) SPLIT BY LOGGED IN VS NOT LOGGED IN

3) SPLIT BY COMPUTER NAME

UPDATING DATA FROM A SOURCE COMPUTER TO GROUPS OF DESTINATION COMPUTERS

BACKGROUND OF THE INVENTION

1. Field of the Invention

This invention relates to the field of data processing systems. More particularly, this invention relates to data processing systems in which it is wished to update out-of-date data stored by a plurality of destination computers with updated data stored by a source computer.

2. Description of the Prior Art

It is known to provide update mechanisms whereby updated data, such as updated versions of a computer program, updated database data, etc., may be automatically distributed from a central source to a plurality of destination computers via a computer network. Such mechanisms are, for example, known and used in the field of computer virus scanning for updating computer virus definition date to client computers quickly and efficiently when updated computer virus definition data becomes available. It is important that such updated computer virus definition data is made available at the destination computers rapidly in order to provide protection against computer virus threats. However, a problem arises in that many hundreds or thousands of destination computers may require the updated data and the amount of network traffic this can generate can overwhelm the computer network concerned and cause it to malfunction or excessively slow down.

It is known to provide mechanisms whereby a single source computer may send data to one or more destination computers via unicasting (point to point communication between two computers), multicasting (one computer communicating to a selected number of other computers) and broadcasting (one computer communicating with every other computer connected to its network). Such techniques are supported by network protocols such as TCP/IP and associated communications hardware (such as network switches) and provide one mechanism that can be used to control the amount of network traffic generated when delivering data from one source to many destinations.

Copending U.S. patent application Ser. Nos. 09/633,358, 09/944,114 and 09/678,692 describe various techniques for controlling the process of updating data held by a source computer to a plurality of destination computers.

Measures which can improve the efficiency and effectiveness of updating data via a computer network are strongly advantageous.

SUMMARY OF THE INVENTION

Viewed from one aspect the present invention provides a computer program product for controlling a source computer to update out-of-date data stored by a plurality of destination computers with updated data stored by said source computer using a computer network connecting said source computer to said plurality of destination computers, said computer program product comprising:

associating code operable to associate priority data specifying a priority level with each destination computer;

establishing code operable in dependence upon said priority data to establish a plurality of groups of destination computers such that destination computers within a group of destination computers share a common priority level;

generating code operable to generate a plurality of push update tasks driven by said source computer, each push update task serving to transfer said updated data from said source computer to a corresponding group of destination computers via said computer network;

ordering code operable to order said plurality of push update tasks in dependence upon said common priority level of each group of destination computers to which a push update task relates to form a sequence of push update tasks such that push update tasks corresponding to a higher common priority level occur within said sequence before push update tasks corresponding to a lower common priority level; and execution code operable to sequentially execute said sequence of push update tasks upon said source computer to transfer said updated data from said source computer to said plurality of destination computers via said computer network.

The invention recognises that when a source computer wishes to push a data update out to a plurality of destination computers, then the effectiveness and efficiency of the overall operation can be improved by breaking the destination computers down into groups, each with an associated priority, and then sending the updated data to the respective groups in accordance with their priority level. Breaking the job down into groups of computers reduces the peak network traffic in a way that can assist in avoiding malfunctions and excessively slow operation. Prioritising the different groups enables the computers which are most critical and have the highest need for the updated data to be associated with high priority groups and so receive that data first. This is particularly important for the push-type of update task that is being performed. Such push-type update tasks are often used as an emergency measure when it is desired to force an update to occur quickly and without having to wait for pull-type transfer technologies to operate whereby a destination computer will poll to see if there is an update available for it and download such an update if one is available. Given that this technique relates to push-type updates for which the destinations are known, the technique avoids merely trying to issue the update simultaneously to all destinations but instead recognises that greater overall efficiency and effectiveness may be achieved by grouping the destination computers and prioritising those groups according to a predetermined priority level.

The efficiency of the distribution of the updated data may be further enhanced by using multicast messaging techniques whereby the source computer may issue multicast messages which are received by a plurality of destination computers. A multicast message can be sent to all computers within a group of destination computers. The group of destination computers can utilise the existing techniques and hardware infrastructure that is often already provided, e.g. for IP multicast messaging, to provide for the division and proper routing of the updated data only to those portions of a network to which it needs to be sent at any particular time.

Whilst the present technique is applicable for a wide variety of different types of data that requires updating, it is particularly well suited for situations in which the updated data is malware definition data and/or a malware scanner program. The time critical nature of the updates required to such malware definition data and malware scanner programs means that the present techniques are highly useful in improving the efficiency of such systems. Practical experience is that when a new and damaging virus is released and the user community becomes aware of such a virus e.g. through high-profile media reporting, then pull-type update techniques can fail as the servers from which such pull-type updates are made often become overloaded and will refuse connections.

It will be appreciated that malware scanners can seek to detect many different types of undesirable computer programs or data such as, for example, computer viruses, worms, Trojans, banned files, banned words and banned images.

It will be appreciated that as the number of destination computers becomes large, it may be that the group of destination computers sharing a common priority level, typically a low priority level, may in itself become sufficiently large that it would cause problems to try to update such a large group simultaneously. Accordingly, preferred embodiments of the invention detect when a group of a particular priority level exceeds a threshold size and operate to split that group down into one or more smaller groups that can then be associated with separate push update tasks that will be sequentially executed despite sharing a common priority level. In this way, excessive peak demand on network traffic resources can be reduced and overall efficiency increased. It will be appreciated that the threshold group size may take a predetermined default value or may be user configurable depending upon the characteristics of the particular computer network and the environment in which the technique is being used.

The splitting of an excessively large group of destination computers into smaller groups can be achieved in a variety of different ways. One particularly preferred mechanism serves to split the large group into smaller groups with each smaller group sharing a network portion. As an example, upon a IP network, a large group may be split into smaller groups each smaller group being within a common subnet. Thus, when those smaller groups are updated only the particular common subnet concerned will be subject to the update traffic during the execution of the particular push update task concerned.

Another way of splitting an excessively large group into smaller groups, and in particular then prioritising those smaller groups, is to divide out those destination computers that are connected but not logged in and treat these as a lower priority group. Computers which are connected but not logged in are typically not being used by the user concerned and accordingly generally have a less urgent need of an update being made.

It will be appreciated that the update to every destination computer within a group may not complete successfully for a given push update task. In order to deal with this, preferred embodiments of the invention provide that if an update has not been completed within a threshold timeout period (possibly set by default or user configurable), then the task concerned will be terminated and the requirement to update the particular destination computer concerned will be rolled forward and added into a subsequent push update task. In this way, an individual computer being particularly slow to accept its push update or failing in that update in some way, will not stall the whole push update process.

Preferred embodiments of the invention serve to issue one or more user alert messages (such as an e-mail message automatically generated and sent to a System Administrator) when an update of a destination computer fails. This enables the user to investigate any problems that may be arising for that destination computer.

Viewed from other aspects the present invention also provides a method of updating out-of-date data and an apparatus for updating out-of-date data in accordance with the above described techniques.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
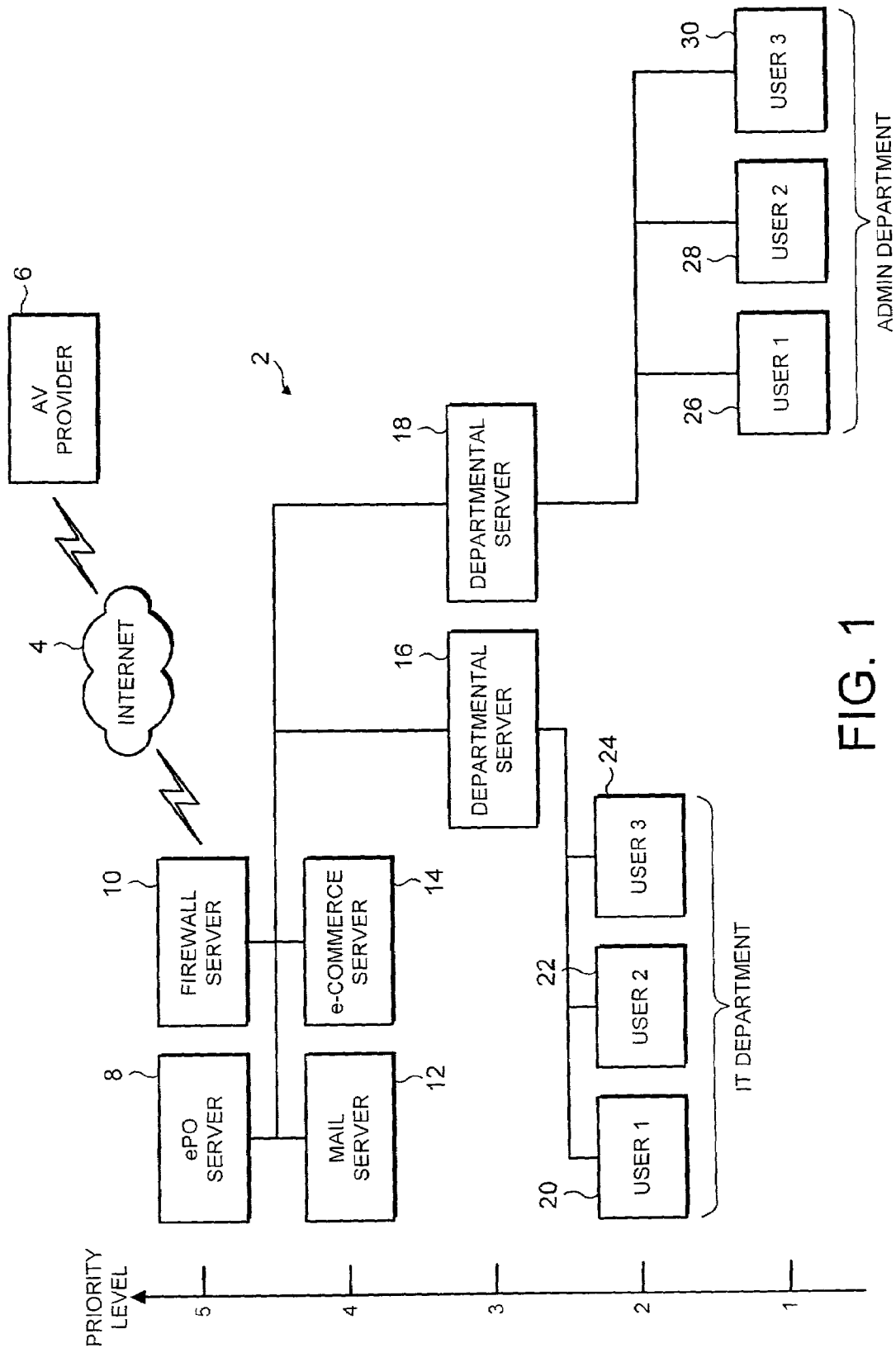
FIG. 1 schematically illustrates a computer network connected to the internet.

FIG. 1 illustrates a computer network 2 connected via the internet 4 to an anti-virus provider's FTP server 6 from which updated virus scanning program engines and virus definition data may be downloaded. A security policy organising server 8 may periodically poll the anti-virus provider's FTP server 6 via a firewall computer 10 and the internet 4 to determine whether or not any updated data is available and should be downloaded by the policy organising server 8 (policy management server) and then applied to its associated network 2. When such updated data, such as malware definition data (e.g. fingerprint data for detecting computer viruses, worms, Trojans, banned files, banned words, banned images etc) or anti-virus scanner engine programs become available, then they are downloaded via the internet 4 to the policy organising server 8. Such policy organising servers 8 and their mechanisms for downloading this data from the anti-virus program provider's FTP server 6 are provided by programs such as ePolicy Orchestrator produced by Network Associates, Inc.

Once the policy organising server 8 has received some updated data which needs to be distributed to the associated further computers within the network 2, then the policy organising server 8 must decide how that updated data is to be distributed. In a pull-type arrangement the policy organising server 8 may merely wait until the various computers within the network 2 poll it to see if an update is available before it then delivers the updated data to the polling computer. However, if the updated data is known to be of high priority, then in order to make it available and used more quickly, a push-type approach is needed. In this push-type approach the policy organising server 8 identifies those computers having the highest need for the updated data and sends the updated data to those computers first. This is achieved by associating a priority level with each computer within the network 2. The policy organising server 8 itself and the firewall server 10 are both allocated the highest priority level available, i.e. "5". The next most critical computers within the network are the mail server 12 and an e-commerce server 14. These two computers are allocated a priority level of "4". Internal departmental servers 16, 18 are allocated a priority level of "3". The individual client computers 20, 22, 24 within the IT Department are deemed to have a priority level of "2", whereas the computers 26, 28, 30 within the Administration Department are deemed to have the lowest level priority of "1". Having predefined a priority level associated with each computer within the network 2, the policy organising server 8 may form computers sharing a common priority level into groups of destination computers to which the updated data is to be sent using a shared push update task. Thus, the policy organising server 8 and the firewall server 10 will be updated by the highest priority and first push update task to execute. Each priority level in turn will then be served by its own push update task emanating from the policy organising server 8 (in this case acting as the source computer). Each of the computers receiving the updated data is a destination computer within an associated group of destination computers that share a common priority level. The splitting of the updating into separate push update tasks that are sequentially executed allows a degree of control to be achieved over the network traffic generated by the update and the order in which updates are performed. This has advantages for the overall efficiency and effectiveness of the updating process.

Figure 2:
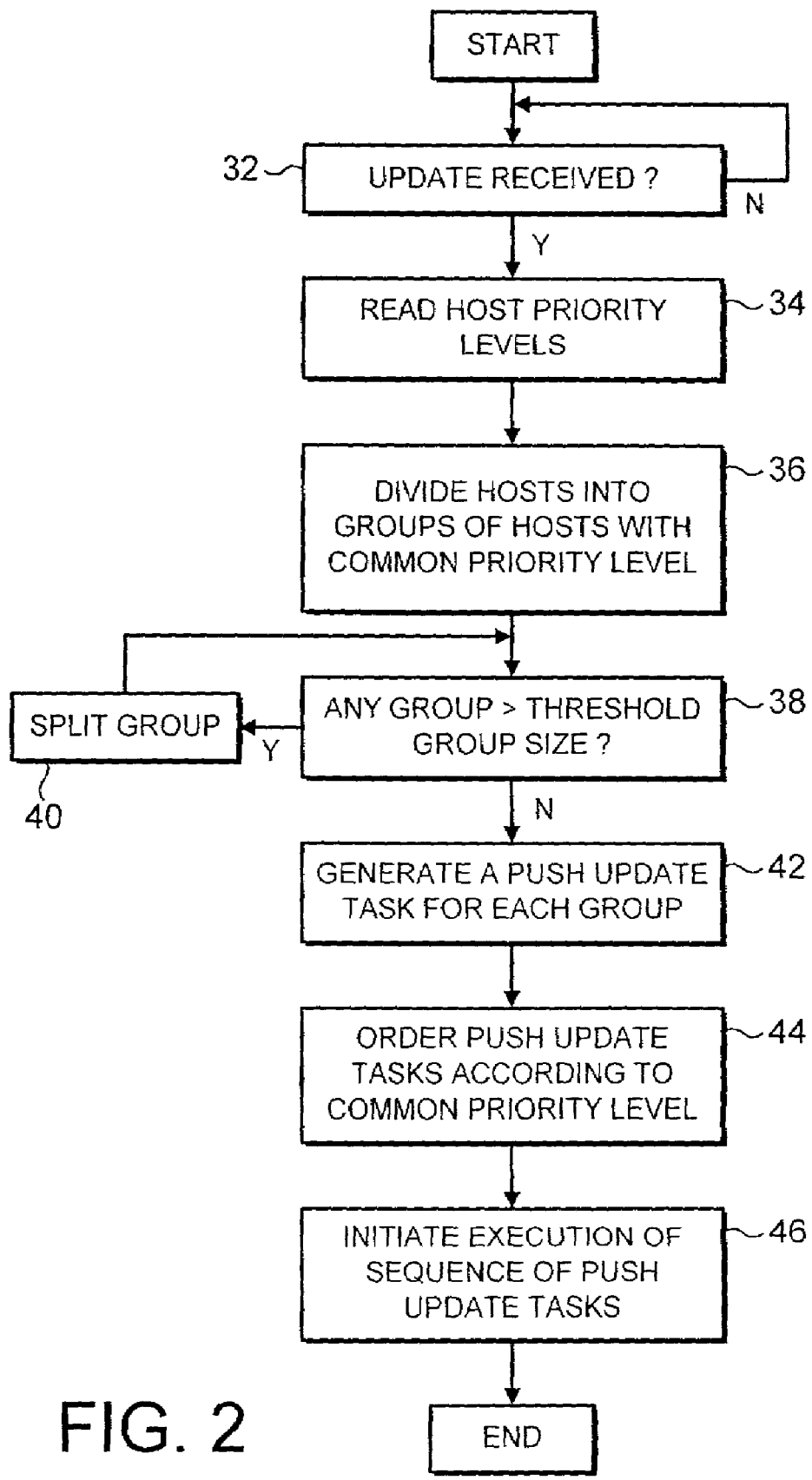
FIG. 2 is a flow diagram illustrating the division of destination computers into groups of destination computers and the prioritising and ordering of push update tasks associated with updating those respective groups.

FIG. 2 is a flow diagram illustrating the processing performed by the source computer (e.g. the policy organising server 8) to divide up the destination computers into groups and associate push update tasks with each group. At step 32 the source computer waits for updated data to be received. When updated data has been received, step 34 reads the priority level associated with each of the destination (host) computers that are managed by the source computer. This priority level data may be stored within a database accessible to the source computer and populated by the system administrator when configuring the source computer. Alternatively, it is possible that each connected destination computer may store its own priority level and communicate this dynamically to the source computer when it first connects to the source computer as it boots up. It is also possible that when an update is required the source computer could poll the destination computers for their priority level, although this might in itself generate an excessive degree of network traffic that would be better avoided at a critical time.

When the source computer has all the priority level data collected at step 34, then step 36 serves to divide the destination computers into groups of destination computers with a common priority level. It will be understood that such groups will typically have a pyramidal structure with there being a relatively small number of high priority computers compared to a larger number of low priority computers. The high priority computers may be updated rapidly, efficiently and reliably using their own push update task before push update tasks are attempted for the larger number of lower priority computers.

After step 36 has divided the destination computers into groups, step 38 determines whether or not any of those groups exceed a threshold group size. This threshold group size may be user defined or a predetermined default parameter. As an example, a System Administrator may decide that it is inefficient if any group exceeds 200 computers to be simultaneously updated by push update task. If any group does exceed this level, then it will be split by step 40 (to be discussed in more detail later) before the test is repeated.

Once the total set of destination computers to be updated has been divided into groups each having fewer than the threshold group size, then step 42 serves to generate a push update task to be associated with each group. Such a push update task will indicate the update data to be applied and the addresses of the destination computers to which that update data is to be directed in that task. It will be appreciated that IP multicasting techniques may be advantageously used in such tasks to reduce the amount of network traffic by collecting appropriate destination computers together within a multicasting group. The mechanisms and techniques of IP multicasting are in themselves known in the field of network traffic management and will not be described herein further.

After the respective push update tasks have been generated, step 44 serves to order this list of tasks into a sequence starting with the highest priority level and finishing with the lowest priority level. If some groups share a preassigned priority level, then it may be that during the splitting process for such large group an implicit further level of priority has in effect been established, e.g. logged in and connected computers may be updated before computers that are connected but not logged in or computers upon which a previous malware infection has been detected may be updated before those having no history of malware infection.

After the sequence of push update tasks has been established, step 46 serves to initiate the execution of this sequence of tasks.

Figure 3:
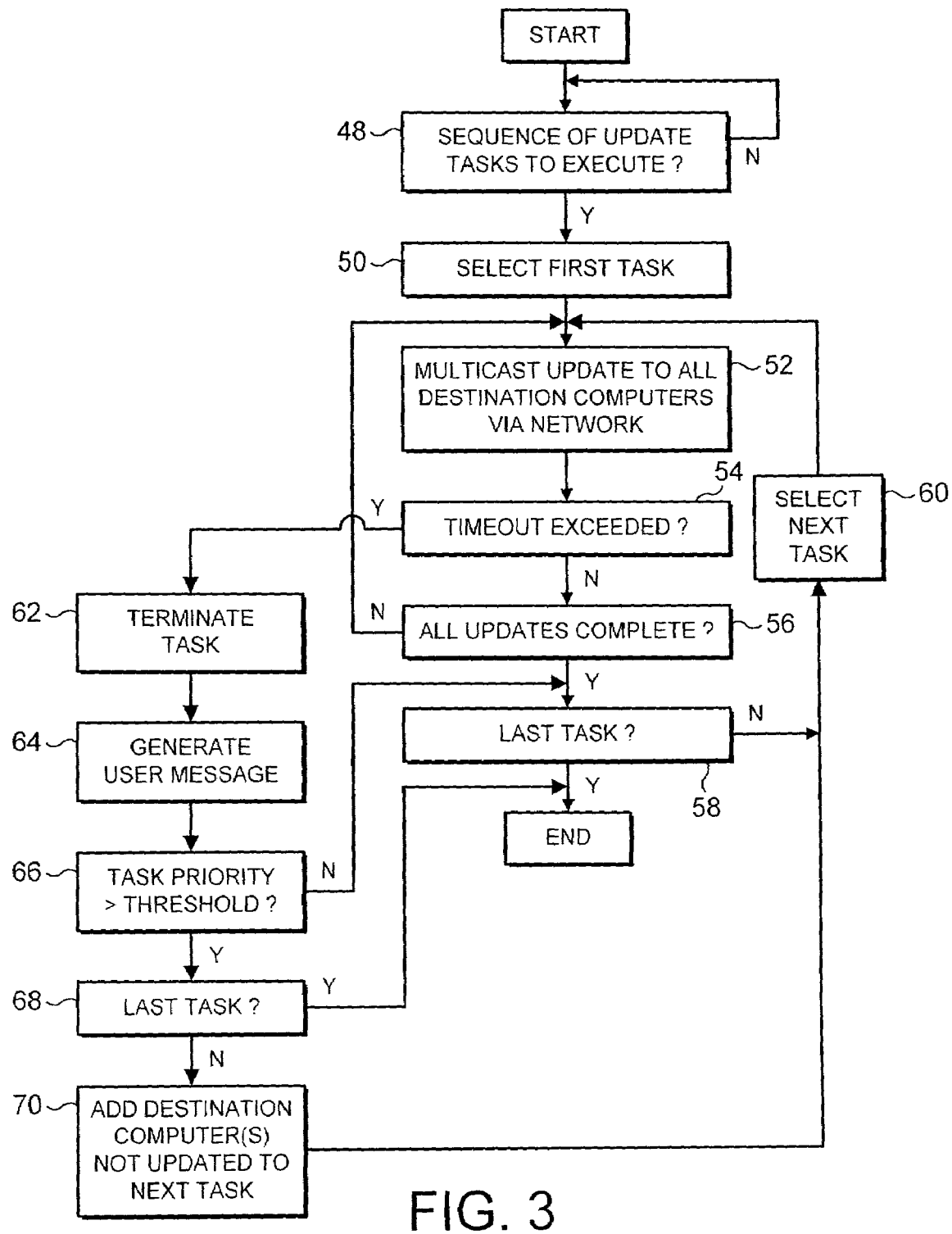
FIG. 3 is a flow diagram illustrating the execution of a sequence of push update tasks.

FIG. 3 is a flow diagram schematically illustrating the execution of a sequence of update tasks. At step 48 the system waits for a sequence of update tasks to be received. When such a sequence is received, step 50 then selects the first task within a sequence and step 52 serves to execute this task in order to update all the destination computers within the group of destination computers associated with that task using multicasting techniques via the computer network 2 connecting the computers concerned. Periodically during the processing at step 52, a check is made at step 54 as to whether a timeout threshold time for the task concerned has been exceeded. If such a threshold time has not been exceeded, then step 56 determines whether or not all the updates required to the destination computers have been completed. If all the updates have not been completed, then processing of the task continues by a return to step 52. If all the updates have been completed, then step 58 determines whether or not the task that has just completed was the last task within the sequence of tasks. If the last task has not yet been completed, then processing proceeds to step 60 at which the next task in the sequence of tasks is selected for starting and processing returns to step 52. If the last task has been completed as indicated by the test at step 58, then the updating process terminates.

If the test at step 54 indicated that the timeout for a particular task had been exceeded, then processing proceeds to step 62 at which the task concerned is terminated. Step 64 then generates a user message, such as an e-mail message to the System Administrator, giving details of the task terminated and the destination computers not completing their update. At step 66 a determination is made as to whether or not the priority level associated with the task that has not completed is above a predetermined (possibly user selectable) level. If a high priority task has not successfully completed, then it may well be worthwhile trying to repeat some of the update operations specified within that task in a subsequent task. Conversely, if the priority level is low then the fact that a particular individual user client computer has not successfully updated for some reason will not justify further attempts to make the update and it is sufficient that user is alerted to the update failure by the message generated at step 64. If the task that has failed does not have a priority level greater than the threshold, then processing proceeds to step 58. If the task that has failed does have a priority level greater than the threshold, then step 68 determines whether or not the task is the last task in the sequence. If the task is the last task in the sequence, then the update failure cannot be forwarded to a subsequent task and processing terminates. If the test at step 68 indicated that the task in which the update failure occurred was not the last task, then step 70 serves to add the destination computer(s) in which the update failure occurred to the next push update task to be performed such that a further attempt can be made to complete the update to those computers. It will be understood that when such a step occurs and an update is forwarded from its initially allocated task into a subsequent task, the destination computer(s) concerned will have a higher priority level than those that by default were placed in the group associated with the task into which the destination computer having the update failure is now being placed.

Figure 4:
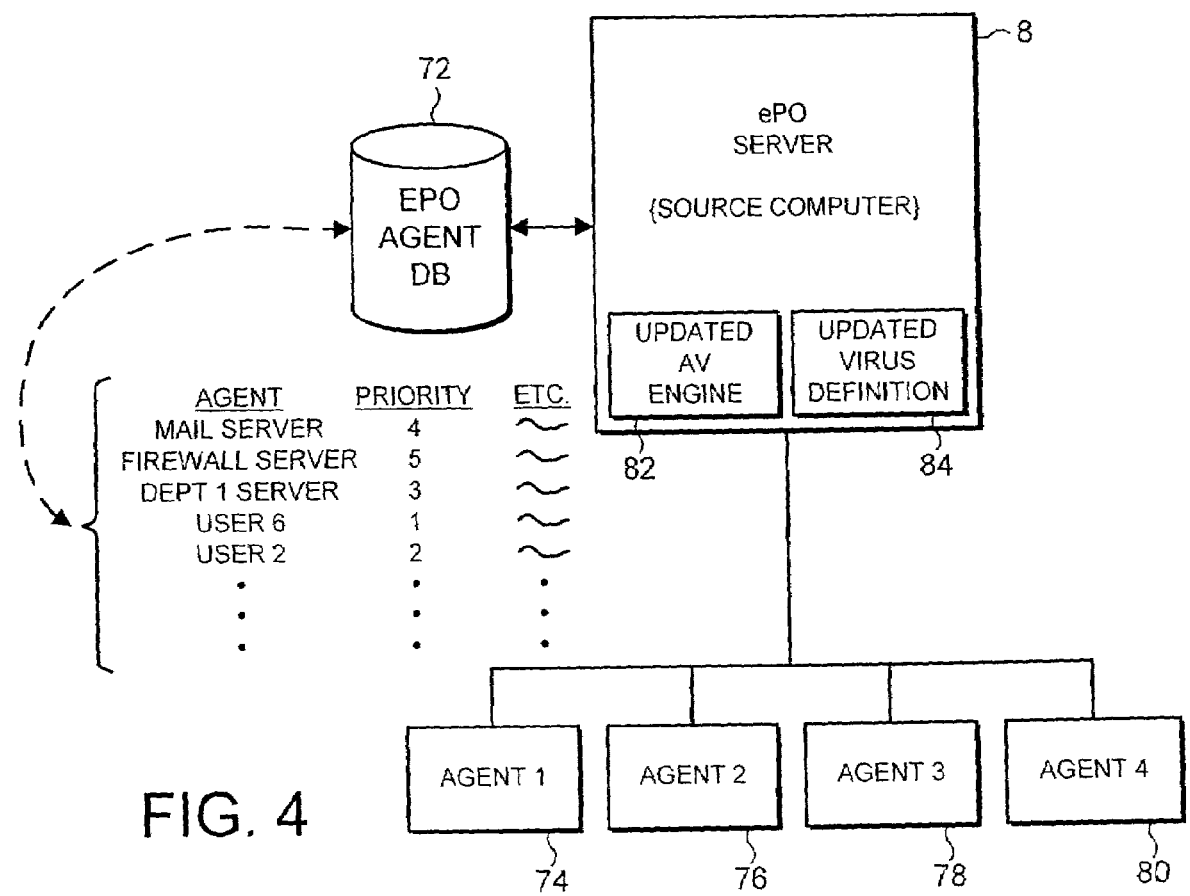
FIG. 4 illustrates a source computer for use in performing the above techniques.

FIG. 4 schematically illustrates the policy organising server 8 in more detail. As is known from this type of arrangement, the policy organising server 8 may have associated agents 74, 76, 78, 80 executing upon connected client computers for which the security policy is being managed by the policy organising server 8. These agents 74, 76, 78, 80 may by default poll for the availability of updates at some predetermined time interval, e.g. every 30 minutes. This polling interval may also be linked to the priority level associated with the updating as described above. A high priority computer may automatically be associated with a shorter polling interval. This may simplify the setup of the overall network 2 in that the System Administrator may merely associate a priority level with a given computer and then have its various parameters that control its updating behaviour adjusted automatically to reflect that priority level.

As illustrated, the policy organising server 8 has an associated database 72 which stores details of all the computers for which it is managing the security policy, the associated priority levels for those computers and other data needed to manage the security of those computers. This database 72 may be permanently held by the policy organising computer 8 and set up by the System Administrator on the policy organising server 8. Alternatively, it is possible that each agent 74, 76, 78, 80 when it connects may provide its own data to the policy organising server 8 to be included within the database 72 and then removed from that database 72 when the respective agent disconnects.

The policy organising server 8 stores a copy of the updated anti-virus scanning engine 82 and the updated virus definition data 84 that it has downloaded via the internet 4 from the anti-virus system provider's FTP server 6.

Figures 5, 6:
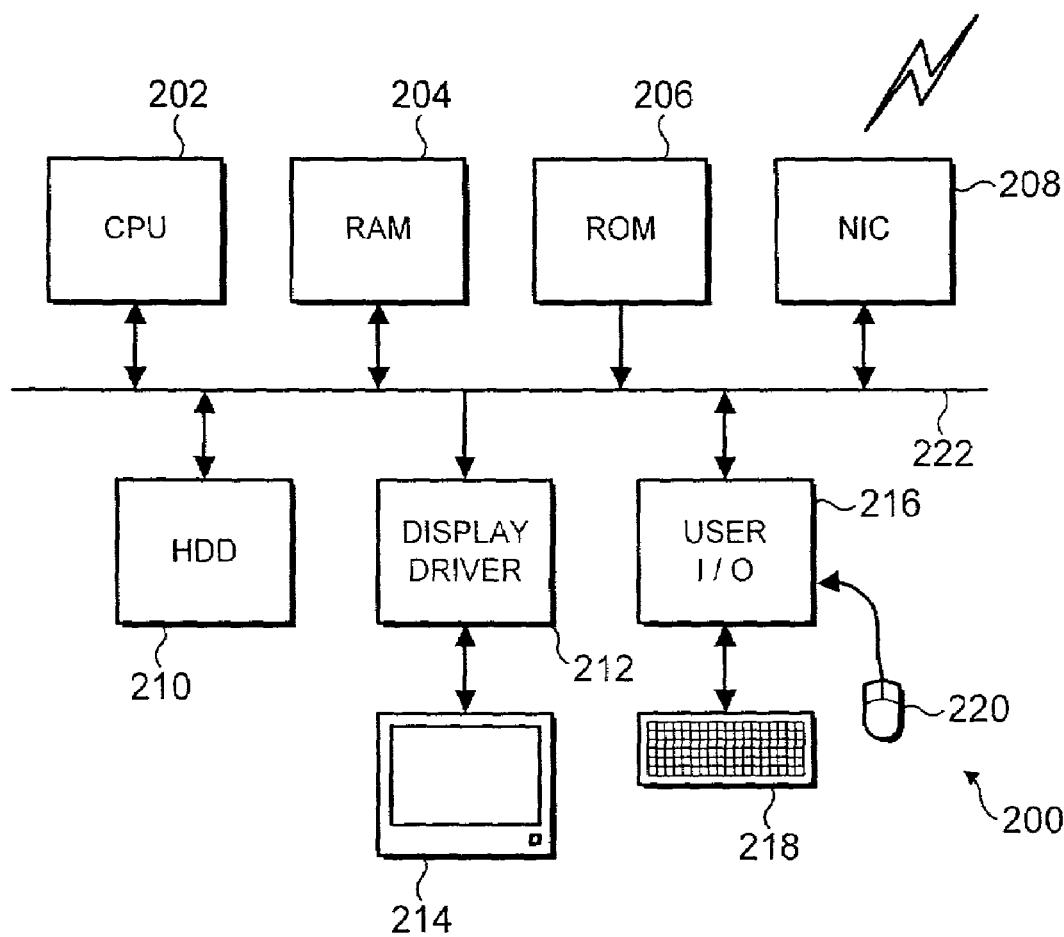
FIG. 5 schematically illustrates a splitting rule hierarchy for use when splitting a group of destination computers that exceeds a threshold size.
FIG. 6 is a diagram schematically illustrating the architecture of a general purpose computer that may be used to implement the above described techniques.

FIG. 5 illustrates a hierarchy of splitting rules that may be applied in step 40 of FIG. 2. Step 40 of FIG. 2 serves to split a group of destination computers that exceeds a threshold size into a plurality of smaller groups. The system seeks to do this by applying the hierarchy of splitting rules illustrated in FIG. 5. The highest priority rule seeks to split the destination computers according to their IP subnet. If it is possible to split the large group by IP subnet into appropriately sized smaller groups each wholly contained within its own subnet or a small number of subnets, then this is strongly advantageous as the network traffic associated with a particular push update task will then tend to be concentrated within those particular subnets and not interfere with other operations of the network 2. If the first splitting rule is not successfully or appropriate, then the second splitting rule may be applied in which a division is made between computers that are logged in and computers that are not logged in. Computers that are not logged in are generally less in need of the update concerned and accordingly can be split into a separate group to be performed after the update for the group of computers that are logged in. The final rule in the hierarchy may be to simply split the destination computers using an alphabetic listing of their computer names on the network.

It will be appreciated that the hierarchy of splitting rules may be separately applied or may be applied in combination. The application of one rule may be sufficient to reduce the group sizes for a given priority level down to below the threshold. Alternatively, one or more of the split groups may still be too large and require further splitting by use of one of the further rules. As a last case rule, the division by alphabetic listing of the computer name may be operated.

FIG. 6 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 6 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product embodied on a computer readable storage medium for controlling a source computer to update out-of-date data stored by a plurality of destination computers with updated data stored by said source computer using a computer network connecting said source computer to said plurality of destination computers, said computer program product comprising:

associating code operable to associate priority data specifying a priority level with each destination computer;

establishing code operable in dependence upon said priority data to establish a plurality of groups of destination computers such that destination computers within a group of destination computers share a common priority level;

generating code operable to generate a plurality of push update tasks driven by said source computer, each push update task serving to transfer said updated data from said source computer to a corresponding group of destination computers via said computer network;

ordering code operable to order said plurality of push update tasks in dependence upon said common priority level of each group of destination computers to which a push update task relates to form a sequence of push update tasks such that push update tasks corresponding to a higher common priority level occur within said sequence before push update tasks corresponding to a lower common priority level; and execution code operable to sequentially execute said sequence of push update tasks upon said source computer to transfer said updated data from said source computer to said plurality of destination computers via said computer network;

wherein said source computer transfers said updated data to said group of destination computers using multicast messages that are addressed to all destination computers within said group of destination computers;

wherein, if any group of destination computers includes more than a threshold number of destination computers sharing said common priority level, then said establishing code is operable to split said group to form said plurality of groups of destination computers from said destination computers sharing said common priority level and said ordering code is operable to order corresponding push update tasks to occur sequentially despite sharing said common priority level;

wherein said splitting allocates destination computers sharing a common network portion of said computer network to a common group;

wherein within said group of destination computers sharing said common priority level and being split, destination computers connected and not logged into said computer network are grouped together and split from and treated as having a lower priority level than destination computers connected and logged into said computer network;

wherein said updated data is one or more of:
malware definition data; and
a malware scanner program.

2. A computer program product embodied on a computer readable storage medium as claimed in claim 1, wherein said computer network uses an IP transmission protocol and said multicast messages are IP multicast messages.

3. A computer program product embodied on all computer readable storage medium as claimed in claim 1, wherein said malware includes one or more of computer viruses, worms, Trojans, banned files, banned words and banned images.

4. A computer program product embodied on a computer readable storage medium as claimed in claim 1, wherein if said push update task has not completed updating all destination computers within said corresponding group of destination computers within a timeout period, then said push update task is terminated and updating of destination computers not completed is added to a subsequent push update task.

5. A computer program product embodied on a computer readable storage medium as claimed in claim 4, wherein a user alert message is generated identifying those destination computers for which updating was not completed.

6. A method of updating out-of-date data stored by a plurality of destination computers with updated data stored by a source computer using a computer network connecting said source computer to said plurality of destination computers, said method comprising the steps of:

associating priority data specifying a priority level with each destination computer; in dependence upon said priority data, establishing a plurality of groups of destination computers such that destination computers within a group of destination computers share a common priority level;

generating a plurality of push update tasks driven by said source computer, each push update task serving to transfer said updated data from said source computer to a corresponding group of destination computers via said computer network;

ordering said plurality of push update tasks in dependence upon said common priority level of each group of destination computers to which a push update task relates to form a sequence of push update tasks such that push update tasks corresponding to a higher common priority level occur within said sequence before push update tasks corresponding to a lower common priority level; and sequentially executing said sequence of push update tasks upon said source computer to transfer said updated data from said source computer to said plurality of destination computers via said computer network;

wherein said source computer transfers said updated data to said group of destination computers using multicast messages that are addressed to all destination computers within said group of destination computers;

wherein, if any group of destination computers includes more than a threshold number of destination computers sharing said common priority level, then said step of establishing splits said group to form said plurality of groups of destination computers from said destination computers sharing said common priority level and said step of ordering orders corresponding push update tasks to occur sequentially despite sharing said common priority level;

wherein said step of splitting allocates destination computers sharing a common network portion of said computer network to a common group;

wherein within said group of destination computers sharing said common priority level and being split, destination computers connected and not logged into said computer network are grouped together and split from and treated as having a lower priority level than destination computers connected and logged into said computer network;

wherein said updated data is one or more of:
malware definition data; and
a malware scanner program.

7. A method as claimed in claim 6, wherein said computer network uses an IP transmission protocol and said multicast messages are IP multicast messages.

8. A method as claimed in claim 6, wherein said malware includes one or more of computer viruses, worms, Trojans, banned files, banned words and banned images.

9. A method as claimed in claim 6, wherein if said push update task has not completed updating all destination computers within said corresponding group of destination computers within a timeout period, then said push update task is terminated and updating of destination computers not completed is added to a subsequent push update task.

10. A method as claimed in claim 9, wherein a user alert message is generated identifying those destination computers for which updating was not completed.

11. Apparatus for updating out-of-date data stored by a plurality of destination computers with updated data stored by a source computer using a computer network connecting said source computer to said plurality of destination computers, said apparatus comprising:
- associating logic operable to associate priority data specifying a priority level with each destination computer;
- establishing logic operable in dependence upon said priority data to establish a plurality of groups of destination computers such that destination computers within a group of destination computers share a common priority level;
- generating logic operable to generate a plurality of push update tasks driven by said source computer, each push update task serving to transfer said updated data from said source computer to a corresponding group of destination computers via said computer network;
- ordering logic operable to order said plurality of push update tasks in dependence upon said common priority level of each group of destination computers to which a push update task relates to form a sequence of push update tasks such that push update tasks corresponding to a higher common priority level occur within said sequence before push update tasks corresponding to a lower common priority level; and
- execution logic operable to sequentially execute said sequence of push update tasks upon said source computer to transfer said updated data from said source computer to said plurality of destination computers via said computer network;
- wherein said source computer transfers said updated data to said group of destination computers using multicast messages that are addressed to all destination computers within said group of destination computers;
- wherein, if any group of destination computers includes more than a threshold number of destination computers sharing said common priority level, then said establishing logic is operable to split said group to form said plurality of groups of destination computers from destination computers sharing said common priority level and said ordering logic is operable to order corresponding push update tasks to occur sequentially despite sharing said common priority level;
- wherein said splitting allocates destination computers sharing a common network portion of said computer network to a common group;
- wherein within said group of destination computers sharing said common priority level and being split, destination computers connected and not logged into said computer network are grouped together and split from and treated as having a lower priority level than destination computers connected and logged into said computer network;
- wherein said updated data is one or more of
- malware definition data; and
- a malware scanner program.

12. Apparatus as claimed in claim 11, wherein said computer network uses an IP transmission protocol and said multicast messages are IP multicast messages.

13. Apparatus as claimed in claim 11, wherein said malware includes one or more of computer viruses, worms, Trojans, banned files, banned words and banned images.

14. A computer program product embodied on a computer readable storage medium as claimed in claim 1, wherein said multicast messages that are addressed to said destination computers within said group of destination computers include a shared push update task.

15. A computer program product embodied on a computer readable storage medium as claimed in claim 1, wherein each destination computer stores said priority data thereof specifying said priority level associated with said destination computer and communicates said priority data thereof with said source computer in response to a first connection with said source computer.

16. A computer program product as claimed in claim 1, wherein said multicast messages tat are addressed to said destination computers within said group of destination computers include a shared push update task.

17. A computer program product as claimed in claim 1, wherein each destination computer stores said priority data thereof specifying said priority level associated with said destination computer and communicates said priority data thereof with said source computer in response to a first connection with said source computer.

* * * * *